(12) United States Patent
Arngren et al.

(10) Patent No.: US 12,705,333 B2
(45) Date of Patent: Aug. 11, 2026

(54) SYSTEM AND METHOD FOR HANDLING AN AUTHENTICATION REQUEST

(71) Applicant: Telefonaktiebolaget LM Ericsson (publ), Stockholm (SE)

(72) Inventors: Tommy Arngren, Södra Sunderbyn (SE); Peter Ökvist, Luleå (SE); Alexander Hunt, Tygelsjö (SE); Andreas Kristensson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/728,118

(22) PCT Filed: Jan. 21, 2022

(86) PCT No.: PCT/SE2022/050065
§ 371 (c)(1),
(2) Date: Jul. 11, 2024

(87) PCT Pub. No.: WO2023/140757
PCT Pub. Date: Jul. 27, 2023

(65) Prior Publication Data
US 2025/0094558 A1 Mar. 20, 2025

(51) Int. Cl.
*G06F 21/44* (2013.01)

(52) U.S. Cl.
CPC .................................... *G06F 21/44* (2013.01)

(58) Field of Classification Search
CPC ....................................................... G06F 21/44
See application file for complete search history.

(56) References Cited

U.S. PATENT DOCUMENTS 8,931,068 B2 * 1/2015 Haynes ................... G06F 21/44 713/186
11,727,098 B2 * 8/2023 Tussy ................... G06V 40/172 726/6
11,871,226 B2 * 1/2024 Maufort .............. H04L 63/0861
11,907,362 B2 * 2/2024 Grobman ................ G06F 21/74
(Continued)

FOREIGN PATENT DOCUMENTS

CN 113468917 A 10/2021
KR 20160097323 A 8/2016

OTHER PUBLICATIONS

"BankID", <https://www.bankid.com/en/> accessed Jan. 24, 2022, 2022, 1-6.

(Continued)

*Primary Examiner* — Simon P Kanaan
(74) *Attorney, Agent, or Firm* — Murphy, Bilak & Homiller, PLLC

(57) ABSTRACT

It is provided a method for handling an authentication request (100), the method comprises the steps of: acquiring data from at least two sensors (110*a*, 110*b*), wherein the acquired data is synchronized when captured by the at least two sensors (110*a*, 110*b*); providing the acquired, synchronized data to an isolated execution environment (120); comparing the synchronized data with synchronization dependent authentication rules; authenticating the request, and notifying a function addressed by the request, in case the synchronized data comply with said authentication rules.

22 Claims, 4 Drawing Sheets

(56) References Cited

U.S. PATENT DOCUMENTS

| | | | | |
|---|---|---|---|---|
| 2015/0154387 | A1* | 6/2015 | Cockcroft | G06Q 20/3276 726/6 |
| 2017/0180386 | A1 | 6/2017 | Dewan et al. | |
| 2018/0089519 | A1 | 3/2018 | Raziel et al. | |
| 2018/0184268 | A1 | 6/2018 | Stitt et al. | |
| 2019/0014113 | A1* | 1/2019 | Khosravi | H04L 63/0861 |
| 2019/0253883 | A1* | 8/2019 | Aylward | G06F 3/0304 |
| 2020/0218698 | A1 | 7/2020 | Lee et al. | |
| 2022/0004611 | A1* | 1/2022 | Whaley | H04L 63/0853 |
| 2025/0094558 | A1* | 3/2025 | Arngren | H04W 12/06 |

OTHER PUBLICATIONS

Author Unknown , "QR Code", Wikipedia, <https://en.wikipedia.org/wiki/QR_code>, accessed Jan. 24, 2022, Jan. 24, 2022, 1-29.

Chakrabarti, Somnath , et al., "Intel® SGX Enabled Key Manager Service with OpenStack Barbican", arXiv:1712.07694, Dec. 20, 2017, 1-28.

Secure Technology Alliance , "Trusted Execution Environment (TEE) 101: A Primer", version 1.0, A Secure Technology Alliance Mobile Council White Paper, Apr. 2018, 1-24.

* cited by examiner

SYSTEM AND METHOD FOR HANDLING AN AUTHENTICATION REQUEST

TECHNICAL FIELD

The present disclosure relates to the field of authentication and in particular to handling an authentication request.

BACKGROUND

Internet banks have increased their security by using a combination of ID and QR code. The purpose with adding the QR code to the previously used ID as part of the user authentication process is to confirm the physical proximity between e.g. a computer using a ID and a smartphone, using a QR code, or vice versa. A separation of the device accessing a service, such as e.g. a banking service provided by an Internet bank, and a device running the Mobile ID reinforces the security for authentication.

Multi-trust Isolated execution environment (IEE) enables multiple IEEs to coexist on a single system; each IEE can be dedicated to one or more specific services or applications; each trusted application (TA) or suite of TAs can claim its own trusted execution environment. A multi-trust IEE also allows IEEs to be started and stopped dynamically, as needs dictate. Additionally, each IEE can set its individual management policies and life-cycle states to better meet the separate needs of each service's ownership model.

SUMMARY

One object with the suggested technical solution is to provide a secure handling of an authentication request.

According to a first aspect, a method for handling an authentication request is provided which comprises the steps of: acquiring data from at least two sensors (110*a*, 110*b*), wherein the acquired data is synchronized when captured by the at least two sensors (110*a*, 110*b*); providing the acquired, synchronized data to an isolated execution environment (120); comparing the synchronized data with synchronization dependent authentication rules; authenticating the request, and notifying a function addressed by the request, in case the synchronized data comply with said authentication rules.

According to one embodiment, one of the sensors is a master sensor, and the acquired data has been synchronized by the master sensor.

According to one embodiment, the synchronized data is provided to the IEE as a real-time bit stream.

According to one embodiment, the data is pre-processed prior to comparing the synchronized data at the isolated execution environment.

According to one embodiment, the pre-processing comprises at least one of image pre-processing and time alignment.

According to one embodiment, the at least two sensors are any of: a camera, an IMU, a fingerprint sensor, an accelerometer, a gyro meter, a magnetometer, a pressure sensor, a temperature sensor, a light sensor, a photosensor, a microphone, a NIR (near infrared) or an IR camera.

According to one embodiment, the acquired synchronized data is transferred to the isolated execution environment through a pass-through channel.

According to one embodiment, the captured data comprise at least one of: image data, pin data, face ID data, audible data, haptic data, light flickering data, heat signature and finger pattern data.

According to one embodiment, the synchronization is executed with respect to at least one of time and at least one observed data pattern.

According to another aspect the synchronization is executed at least with respect to data arranged according to at least one data pattern, wherein the at least one data pattern is any of: an audio pattern, a haptic pattern, a light flickering pattern and a gait pattern.

According to one embodiment, the acquired data is acquired by applying any of a random or round-robin method.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Though Internet banks have increased their security by using a combination of sensors, such as sensors capable of capturing e.g. a ID and a QR code, the purpose with adding a QR code as part of a user authentication process is to confirm the physical proximity between used devices, such as e.g. a computer and a smartphone, applied in the authentication process, so that these devices can be assumed to have been used by the same person at the same time or with a relatively small time difference between events executed in each respective user device. A separation of the device accessing a service, provided by e.g. an Internet bank, and a device running the Mobile ID reinforces the security for authentication. Solutions of today does however not allow random data input from different sensors forming part of the same device to be synchronized in a secure and trusted manner. This invention solves the existing problem through a secure synchronization of data captured by two or more sensors. The synchronized data is provided to an IEE, where the synchronized data is compared to authentication rules for determining if the synchronized data can be authenticated or not, i.e. if the synchronized data can be trusted as data provided from one single user and that this data has not been tampered with.

Today's solutions fail to be capable of handling requests in a trusted way, when two or more sensors are used by a process, configured to verify that the request can actually be trusted.

Figure 1:
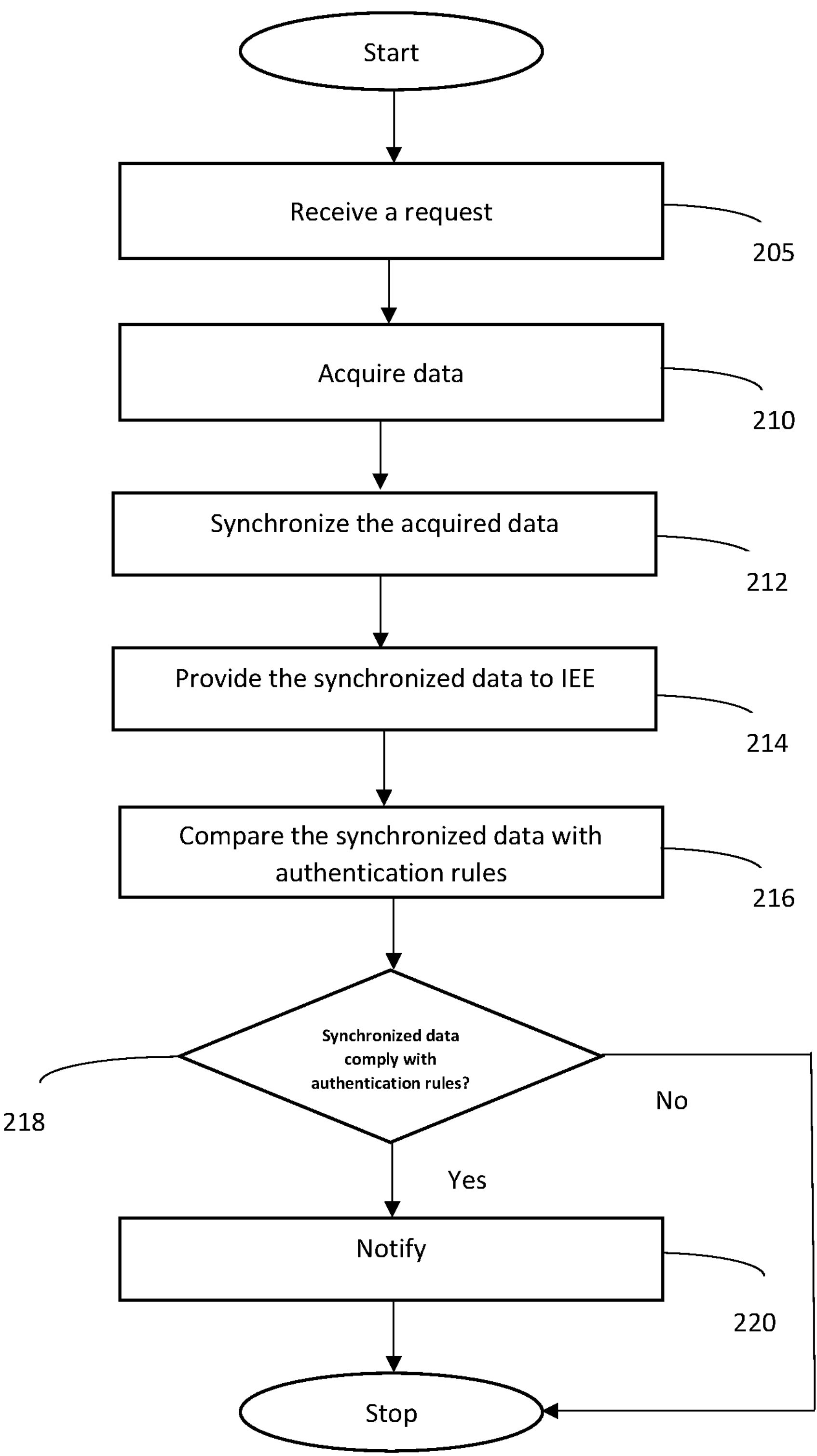
FIG. 1 is a flow chart illustrating a method of handling an authentication request.

In embodiments presented herein a simplified method for handling an authentication request is described in further detail, with reference to FIG. 1.

FIG. 1 is a flowchart referring to steps 205-220 which describe a method, executable in a communication device, where data is acquired from two or more sensors (110*a*, 110*b*), forming part of one single device, as indicated with step 210, in response to having received a request for a specific task or service in a preceding step 205. For example, sensors of a communication device (e.g. smartphone cameras) may capture randomized data patterns in a secure and trusted manner allowing the device to determine that all of the used sensors with high probability are located at a same location. According to one example an image capturing sensor, such as e.g. a front camera of the device, is capable of capturing image data, such as e.g. a QR code in front of a camera, whereas another image capturing sensor, such as e.g. a rear camera of the device, is capable of capturing other image data, such as e.g. a picture of a user or the eye of a user behind the camera, where the mentioned sensors are located in one single device, i.e. at the same location. In yet another example an image capturing sensor, such as e.g. a camera is capable of capturing a image whereas another sensor, other than an image capturing sensor, such as e.g. a fingerprint sensor, is capable of capturing fingerprint data. A user executing a request for a specific task automatically triggers the mentioned authentication procedure to be executed, including the capturing and synchronisation of sensor data, without any need of further user intervention.

Many different types of sensors (110*a*, 110*b*) may be used in combination, as suggested herein, such as e.g. any of: a camera, an IMU, a fingerprint sensor, an accelerometer, a gyro meter, a magnetometer, a pressure sensor, a temperature sensor, a light sensor, a photosensor, a microphone or an IR camera.

Different types of sensor data, captured by sensors may be combined in the suggested authentication process, where the sensor data may, depending on the sensors applied, comprise any combination of: pin data, face ID data, audible data, haptic data, light flickering data or finger pattern data. A user executing a request for a specific task automatically triggers the mentioned authentication procedure to be executed, including the capturing and synchronisation of sensor data, without any need of further user intervention.

The acquired data is synchronized, as indicated with step 212, where the synchronization involves the maintenance of data to keep multiple copies of data that is considered to, to at least some extent, be coherent with each other, and to maintain data integrity and wherein the synchronization is executed at least with respect to time. The time synchronization is verified by a respective time stamp, allocated to each captured data.

The synchronization can take place in any of the sensors, after which the synchronized data is provided to an IEE, as indicated with step 214, where the synchronized data is compared with authentication rules, as indicated with step 216.

If the IEE is able to verify the synchronized data from the sensors it will be able to accept the authentication request, with the assumption that the synchronized data has not been tempered with when the data has passed through the device to the IEE. This is due to that the IEE can be referred to as a purpose specific security element that can undergo security evaluations and deliver assurance for applications or data. The secure element in the IEE offers protection for sensitive code and data relevant in emerging use cases, such as e.g., mobile payment solutions, trust, content protection, credentials management, and corporate applications for consumer devices.

The mentioned authentication rules are rules that have been predefined in the isolated execution environment as relevant synchronization dependent rules, and may be defined based on different synchronization criteria, including one or more of: timing aspects, type of sensors, number of sensors and sensor patterns and different requests, such that different categories of authentication requests are triggering different categories of synchronization dependent rules to be applied. For example, criteria based on timing aspects of the data captured by the sensors can be synchronized. In another example a front camera, back camera and IMU may capture and synchronize respective motion patterns between a determined start time and a determined stop time, e.g. by having an IMU indicating a rotation around one axis and the camera inputs indicating respective horizontal swipes.

If the synchronized data comply with the applied authentication rules, as indicated with the "Yes" branch of step 218, a function addressed by the request is notified of the request, as indicated with step 220, thereby enabling execution of the requested task. If the synchronized data does not comply with the authentication rules, as indicated with the "No" branch of step 218, then the request is denied, and the method is stopped.

Figure 2:
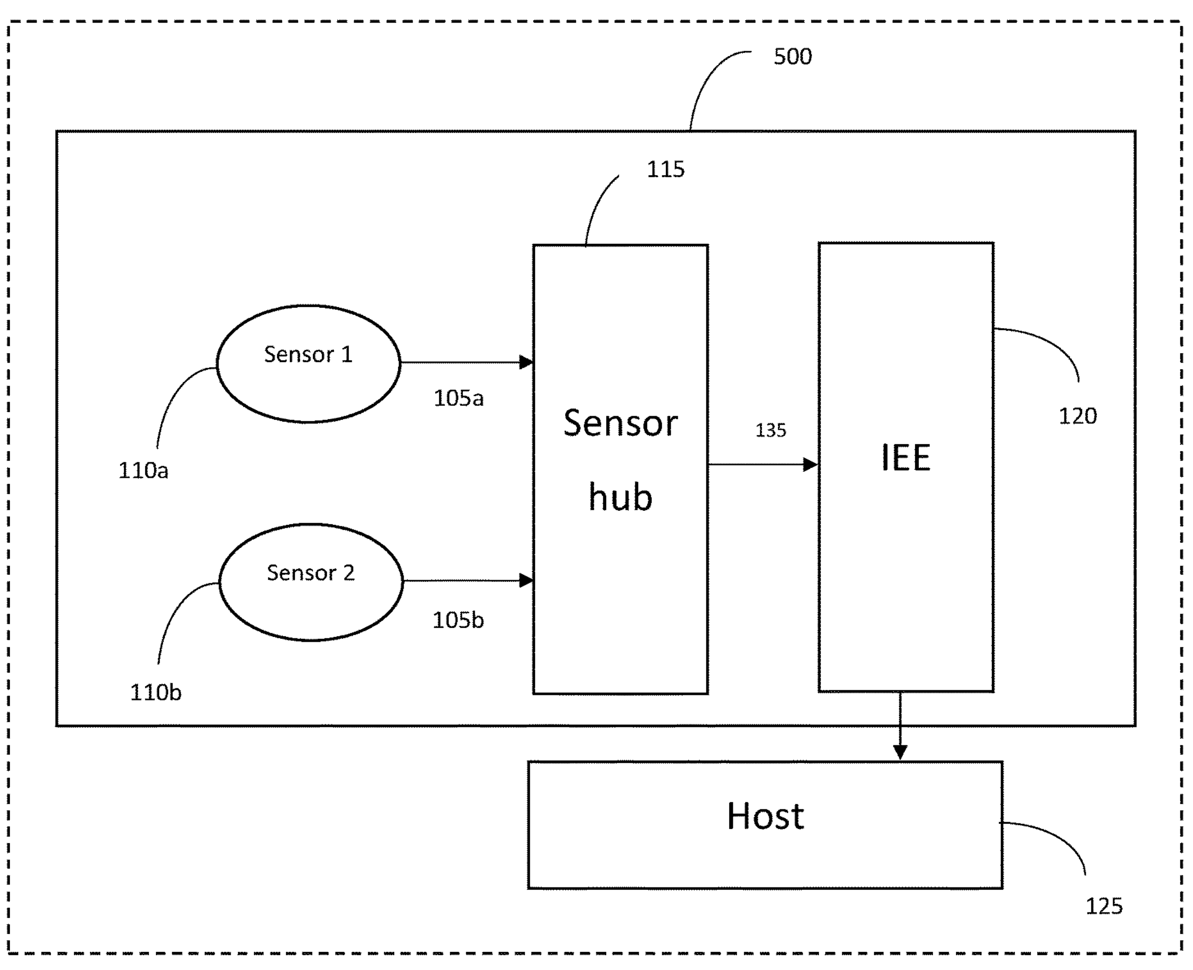
FIG. 2 is a schematic diagram illustrating a communication device capable of executing an authentication request, according to one embodiment.

According to another aspect, a communication device 500, capable of executing the method described above, with reference to FIG. 1, will now be described in further detail, with reference to FIG. 2. The communication device 500 comprise at least two sensors 110*a*, 110*b*, a sensor hub 115 and an IEE 120. As already mentioned, a sensor may be any of e.g. a front camera, a back camera, an inertial measurement unit (IMU), etc., The communication device 500 is configured to initiate the capturing and synchronization of sensor data, in response to having received a request. The sensor hub 115 is configured to aggregate the captured and synchronized data via respective channels 105*a*, 105*b*. The sensor hub 115 may also be configured to pre-process the synchronized data, before it is provided to the IEE 120 for comparison of the synchronized data to applicable rules. The sensor hub 115 may be a digital signal processor (DSP), an image signal processor (ISP), or any other processor, capable of processing synchronized data as described herein.

The IEE 120 is configured to process the information provide from the sensor hub 115, by analysing the synchronized data. If the synchronized data has not been preprocessed already in the sensor hub, or in addition, it is pre-processed in the IEE before it is analysed, wherein the pre-processing converts the signals into digital/image data that can then be processed and analysed. The synchronized data can be provided to the IEE 120 through a pass-through channel 135, or any other type of secure channel, which is capable of assuring that the synchronized data has not been tampered with when received by the IEE 120. The processing in the IEE 120 comprise checking if the synchronized data comply with the authentication rules or not.

If the synchronized data comply with the authentication rules then IEE 120 is configured to provide the request to a function of a functional entity, here referred to as a host 125, which function is addressed by the request and capable of executing a requested task, according to the request. The host 125 may be any hardware device that has the capability of permitting execution of a function according to a received request. If the synchronized data do not comply with the authentication rules, the IEE 120 is instead configured to reject the request. The host 125 may form part of the communication device or may be connected to the communication device as a separate device.

Alternatively, the host may take a more active role in the process, such that step 210 of FIG. 1 also comprise that the hub 115 is notifying the host 125 of the request, after which the host 125 requests for the suggested authentication from the IEE 120. In such a scenario, step 212 also comprises that the IEE 120 respond to such a request, by setting up the sensors 110*a*,110*b* for relevant synchronized data capturing.

According to an alternative embodiment, one of the sensors may act as a master. Prior to synchronization the master sensor needs to prepare the sensor for capturing data and synchronization. Synchronization can be done with respect both of time and data pattern i.e. data is captured by two or more sensors within a certain time frame, and a respective data pattern is recognized by two or more sensors.

Figure 3:
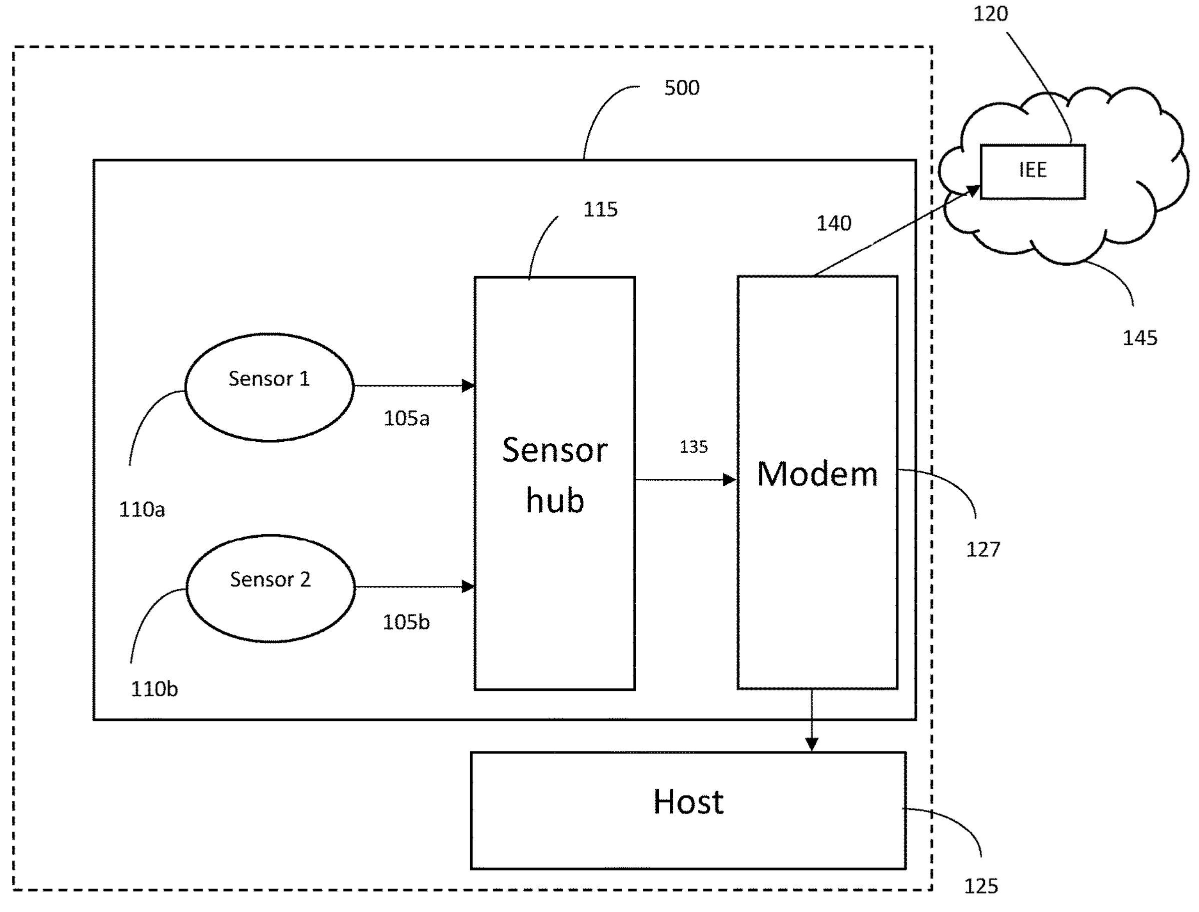
FIG. 3 is another schematic diagram illustrating a communication device capable of executing an authentication request according to another embodiment.

The suggested solution can alternatively be arranged as a system, here according to another embodiment, referring to FIG. 3, where the IEE 120 is placed on a cloud server 145, instead of in the communication device 500. The system here refers to the communication device 500, cooperating with a cloud server 145 or corresponding cloud functionality. According to this embodiment, the communication device 500 also comprises a modem 127, configured to enable the synchronized data to be transmitted from the sensor hub 115 to the IEE 120 of the cloud server 145 through a secure channel 140. Here the secure channel assures that the data can't be tampered during transmission to the IEE 120. If the authentication is approved by the IEE 120, the IEE 120 informs the host 125 of this via the modem 127, via the secure channel 140.

A method executed by the system 600 will be in accordance with the method as described above, with reference to FIG. 1, where steps 205-210 are executed in the communication device, whereas 216-218 are executed in the IEE and step 220 is executed in both the communication device and the IEE in cooperation.

Figure 4:
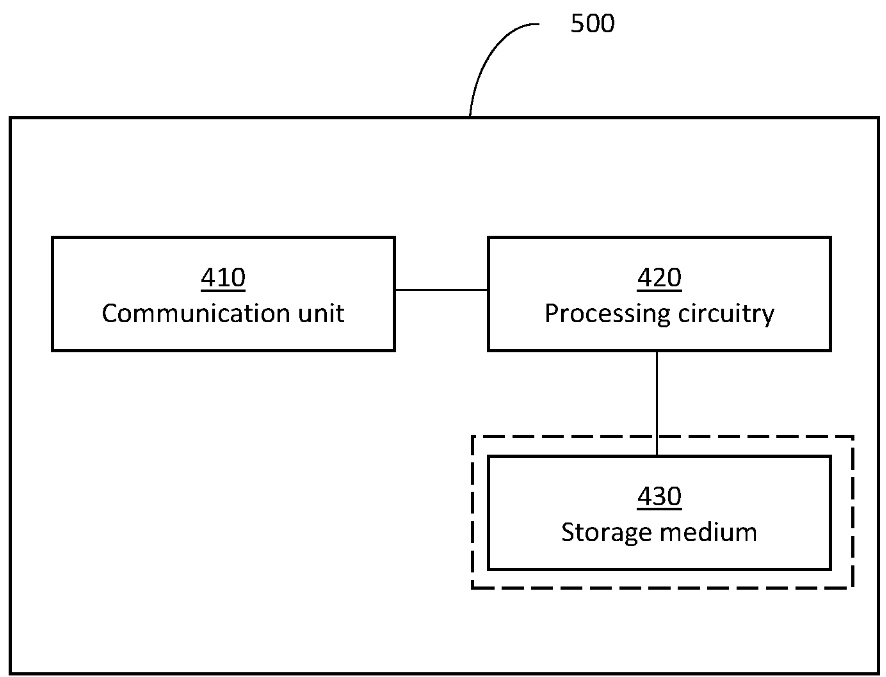
FIG. 4 is a schematic diagram illustrating functional units of a communication device according to an embodiment.

According to one aspect, a communication device 500, capable of operating according to one or more of the embodiments described above may be configures as described in FIG. 4. The communication device 500, comprise processing circuitry 420, using any combination of one or more of a suitable central processing unit (CPU), multiprocessor, microcontroller, digital signal processor (DSP), etc., capable of executing software instructions stored in a computer program, e.g., in the form of a storage medium 430. The processing circuitry 420 may further be provided as at least one application specific integrated circuit (ASIC), or field programmable gate array (FPGA). Particularly, the processing circuitry 420 is configured to cause the communication device 500 to perform a set of operations, or actions, as disclosed above. For example, the storage medium 430 may store the set of operations, and the processing circuitry 420 may be configured to retrieve the set of operations from the storage medium 430 to cause the communication device 500 to perform the set of operations. The set of operations may be provided as a set of executable instructions. The processing circuitry 420 is thereby arranged to execute methods as herein disclosed. The storage medium 430 may also comprise persistent storage, which, for example, can be any single one or combination of magnetic memory, optical memory, solid state memory or even remotely mounted memory. The communication device 500 may further comprise a communication unit 410 configured to enable the communication device 500 to communicate with other entities, functions, nodes, and devices, over suitable interfaces. As such the communication unit 410 may comprise one or more transmitters and receivers, comprising analogue and digital components. The processing circuitry 420 is configured to control the general operations of the communication device 500 e.g., by exchanging data and control signals with any external entity via the communication unit 410 and a suitable communications interface. Other components, as well as the related functionality, of the communication device 500 are omitted in order not to obscure the concepts presented herein.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for handling an authentication request, the method comprising:

acquiring, in response to receiving a request, data from at least two sensors, wherein the acquired data is synchronized when captured by the at least two sensors;

providing the acquired data to an isolated execution environment;

comparing the acquired data with synchronization dependent authentication rules that require data from different sensors to be coherent with one another to an extent which indicates the data from different sensors were acquired at the same location; and authenticating the authentication request, and notifying a function addressed by the authentication request, in case the acquired data comply with said synchronization dependent authentication rules.

2. The method according to claim 1, wherein one of the at least two sensors is a master sensor, and wherein the acquired data has been synchronized by the master sensor.

3. The method according to claim 1, wherein the master sensor is synchronized based on a time and a data pattern.

4. The method according to claim 1, wherein the acquired data is:

provided to the isolated execution environment as a real-time bit stream to be processed within the isolated execution environment; or preprocessed prior to comparing the acquired data at the isolated execution environment.

5. The method according to claim 1, wherein the acquired data is preprocessed prior to comparing the acquired data at the isolated execution environment, wherein the preprocessing comprises at least one of image pre-processing and time alignment.

6. The method according to claim 1, wherein each of the at least two sensors are any of: a camera, an IMU, a fingerprint sensor, an accelerometer, a gyro meter, a magnetometer, a pressure sensor, a temperature sensor, a light sensor, a photosensor, a microphone or an IR camera.

7. The method according to claim 1, wherein the acquired data is transferred to the isolated execution environment through a pass-through channel.

8. The method according to claim 1, wherein the acquired data comprise at least one of: image data, pin data, face ID data, audible data, haptic data, light flickering data and fingerprint data.

9. The method according to claim 1, wherein synchronization of the acquired data is executed:

with respect to at least one of time and at least one observed data pattern.

10. The method of claim 1, wherein the acquired data comprises data of different data types from at least two sensors of at least two different sensor types, wherein the synchronization dependent authentication rules require data of different data types to be coherent with one another to an extent which indicates the data of different data types were acquired at the same location.

11. The method of claim 1, wherein the synchronization dependent authentication rules require data from different sensors to be coherent with one another in terms of a pattern of the data over time.

12. The method of claim 1, wherein said comparing comprises:

comparing data from the at least two sensors to one another in order to determine an extent to which the data from the at least two sensors are coherent with one another; and comparing the determined extent to the extent required by the synchronization dependent authentication rules.

13. A communication device for handling an authentication request, the communication device comprising processing circuitry configured to:

acquire data from at least two sensors, wherein the acquired data is synchronized when captured by the at least two sensors;

provide the acquired data to an isolated execution environment;

compare the acquired data with synchronization dependent authentication rules that require data from different sensors to be coherent with one another to an extent which indicates the data from different sensors were acquired at the same location; and authenticate the authentication request, and notify a function addressed by the authentication request, in case the acquired data comply with said synchronization dependent authentication rules.

14. The communication device according to claim 13, wherein one of the sensors is configured to act as a master sensor, and wherein the master sensor is configured to synchronize the acquired data.

15. The communication device according to claim 14, wherein the master sensor is configured to synchronize the acquired data based on a time and a data pattern.

16. The communication device according to claim 13, wherein the acquired data is:

provided to the isolated execution environment as a real-time bit stream to be processed within the isolated execution environment; or preprocessed prior to comparing the acquired data at the isolated execution environment.

17. The communication device according to claim 13, wherein the acquired data is preprocessed prior to comparing the acquired data at the isolated execution environment, wherein the preprocessing comprises at least one of image pre-processing and time alignment.

18. The communication device according to claim 13, wherein each of the at least two sensors comprise any of: a camera, an IMU, a fingerprint sensor, an accelerometer, a gyro meter, a magnetometer, a pressure sensor, a temperature sensor, a light sensor, a photosensor, a microphone or an IR camera.

19. The communication device according to claim 13, wherein the processing circuitry is further configured to transfer the acquired data to the isolated execution environment through a pass-through channel.

20. The communication device according to claim 13, wherein the acquired data comprise at least one of: image data, pin data, face ID data, audible data, haptic data, light flickering data and fingerprint data.

21. The communication device according to claim 13, wherein synchronization of the acquired data is executed:

with respect to at least one of time and at least one observed data pattern.

22. A system for handling an authentication request, the system comprising:

a user device;

at least two sensors; and an isolated execution environment, arranged within a cloud server;

wherein the system is configured to:

acquire data from the at least two sensors, wherein the acquired data is synchronized when captured by the at least two sensors;

provide the acquired data to the isolated execution environment;

compare the acquired data with synchronization dependent authentication rules that require data from different sensors to be coherent with one another to an extent which indicates the data from different sensors were acquired at the same location;

authenticate the authentication request, and notify a function addressed by the authentication request, in case the acquired data comply with said synchronization dependent authentication rules.

* * * * *